Patented Nov. 20, 1934

1,980,987

UNITED STATES PATENT OFFICE 1,980,987

XYLENITIC RESIN AND PROCESS OF MAKING SAME

Carleton Ellis, Montclair, N. J., assignor to Ellis-Foster Company, a corporation of New Jersey No Drawing. Application November 24, 1924, Serial No. 751,867

26 Claims. (Cl. 260—4)

This invention relates to synthetic resins, to molding compositions made therefrom and to the process of making same and relates particularly to resinous products prepared from the xylenols. The xylenols, more particularly in the crude form as mixtures obtained from coal tar etc., react with aldehydes, for example formaldehyde, to produce resinous substances. Heretofore the xylenols have been looked upon as of little value in making synthetic resins for plastic molding purposes especially in the production of quick curing compositions. One object of the present invention is to employ the xylenols or fractions of crude distillates containing a large or preponderating proportion of xylenols to make the aforesaid resinous products and to employ them by themselves or preferably with a filler to make molding compositions which have the property of setting or hardening in the mold in a very short time thus enabling molded articles to be made very rapidly with low labor cost.

The xylenols especially in the crude form are relatively cheap and the present invention has as a further object the production of molding compositions low in cost.

The following is an example of a procedure carried out in accordance with my invention, although this is given in a detailed and specific manner I do not wish to be limited to such details.

30 parts by weight of magnesium oxide are ground with 150 parts of aqueous formaldehyde of 40 per cent strength. 120 parts of this ground material (which in the first instance is creamy but gradually sets to a jelly) are mixed with 122 parts of a distillate containing xylenols. The distillate is one which starts boiling between 200° and 205° C. and of which about 50 per cent distills over up to 212° C., the balance distilling over between 220° and 225° C. The fraction is soluble in aqueous caustic soda solution.

The mixture is warmed to 70° C. with agitation and is tested frequently by the fuchsine test to determine the time required for complete absorption of the formaldehyde. In the particular example given the time required was 25 minutes but this presumably will vary somewhat depending upon the size of the batch which is being processed. At the end of 25 minutes the fuchsine test shows only a faint coloration on standing for 15 seconds. The product is a jelly-like substance light in color. This is dried in a vacuum dryer to constant weight which in the present instance required 1 hour and 40 minutes in the vacuum pan at a temperature finally reaching 72° C.

A light yellow mass somewhat resembling sulphur in color and rather friable was obtained. This was passed through a grinder to break up the lumps into a coarse powder and 100 parts by weight of the material were ground in a pebble mill with 100 parts of wood flour for 2 hours. In one case 1 per cent of carbon black for coloring purposes and 1 per cent of aluminum palmitate as a mold lubricant were added.

When molded in the hot press at 165° C. for 3 minutes a well cured article was obtained. When hot from the mold the specimen had a very slight degree of rubberiness which is desirable as it permits articles to be taken from complicated molds without breakage. However the degree of rubberiness must be very slight otherwise deformation map occur in removing the specimen. In the present case the time of cure was sufficiently brief to meet commercial requirements, the degree of rubberiness was just sufficient to overcome breakage losses without bringing about deformation and the surface of the molded specimen was satisfactory.

A peculiar feature of the resin is its lack of flow when it is placed on a hot plate without filler. A resin made from phenol and formaldehyde sufficiently fusible to mold properly will even though of the quick curing type flow out on a hot plate rather freely and then suddenly set. The action may be compared to that of the flow of pancake batter on a hot griddle. The batter spreads freely to a certain point and then sets. This property is supposed to be necessary in order to obtain molding compositions which flow freely into all parts of the mold and yield a good impression. With the xylenitic resin of the present invention the composition made in accordance with the illustrative formula when placed on the hot plate without filler did not flow but slightly softened. It was assumed that this resin had been reacted too far or under conditions which would make what is termed an overcured product which would not flow freely in the mold. Therefore it was a matter of surprise to find when incorporated with filler and molded as aforesaid a perfect molded article was obtained, the flow being adequate despite the adverse indications in the hot plate test.

The method described above of incorporating filler is cheap and efficient. Filler of a porous character such as wood flour may be incorporated with resin by means of solvents which afterwards are removed or the resin may be worked on rolls with the filler. The latter however involves considerable labor cost and the present procedure of incorporating by grinding in a ball mill gives excellent results.

Various fillers may be employed such as mineral powders, clay, asbestos powder, whiting, gypsum and the like, fibrous asbestos, paper, flock etc.

The addition of hexamethylenetetramine is not precluded. It may be noted that when the resin without filler was molded in a press at 165° C. setting occurred in 50 seconds to such an extent that a pressure of 1000 to 1200 pounds could be applied without forcing the resin out of the mold. Despite this rapid curing the product as noted above yields an excellent impression on the mold.

The use of aldehydes other than formaldehyde including acetaldehyde, paraldehyde, furfural, butyl aldehyde, acrolein, benzaldehyde etc. or mixtures of these with or without formaldehyde is not precluded.

The reaction between the xylenols and the aldehyde may take place in an appropriate medium which may be acid, alkaline or neutral according to the nature of the aldehyde. For example acetaldehyde reacts advantageously in the presence of an acid.

The use of other substances in place of magnesium oxide or hydroxide is not precluded, quick lime or calcium hydroxide, barium oxide, barium hydroxide and the like also may be employed. However the latter substances as also hexamethylenetetramine have a greater tendency to form blisters in the molded articles. Magnesium oxide especially when employed approximately mol for mol with the xylenols enables the production of the peculiar resinous substance which under ordinary pressure appears to have poor flowing qualities but which in the mold flows readily and sets quickly.

Although I have described the invention with reference to the employment of crude xylenols containing some cresols I may use fractions the boiling point of which starts somewhat higher and are practically free from cresols.

In the specification and claims I have used the brief term xylenitic resin to embrace the products of the present invention whether these be prepared from xylenols or crude xylenols and aldehydes in the presence of an acid or whether a substance such as magnesium oxide or calcium oxide is employed to obtain xylenates in greater or less degree and xylenate resins corresponding thereto.

What I claim is:—

1. Xylenol-formaldehyde-magnesium oxide resin softening but not flowing on a hot plate at atmospheric pressure but flowing freely and setting to a hard mass when subjected to hot pressing at a temperature of about 165° C.

2. The process of making a synthetic resin which comprises causing substantially pure xylenol to react with a second reactant of the type that is used in the preparation of phenolic resins to give an initial condensation product which is capable of being converted by further heating into a hard, infusible, insoluble resin.

3. The process of making a synthetic resin which comprises causing substantially pure xylenol to react with a compound having an aldehyde group to give an initial condensation product which is capable of being converted by further heating into a hard, infusible, insoluble resin.

4. The process of making a synthetic resin which comprises causing formaldehyde to react with substantially pure xylenol to give an initial condensation product which is capable of being converted by further heating into a hard, infusible, insoluble resin.

5. The process of making a synthetic resin which comprises causing substantially pure xylenol and a second reactant of the type that is used in the preparation of phenolic resins to react to form an initial condensation product and thereafter further heating the compound to form a hard, infusible, insoluble resin.

6. The process of making a synthetic resin which comprises causing substantially pure xylenol and an aldehydic compound to react to form an initial condensation product and thereafter further heating the compound to form a hard, infusible, insoluble resin.

7. The process of making a synthetic resin which comprises causing substantially pure xylenol and formaldehyde to react to form an initial condensation product and thereafter further heating the compound to form a hard, infusible, insoluble resin.

8. An initial condensation product resulting from the reaction between a second reactant of the type that is used in the preparation of phenolic resins and substantially pure xylenol which is capable of transformation into a hard, infusible, insoluble resin by further heating.

9. An initial condensation product resulting from the reaction between an aldehydic compound and substantially pure xylenol which is capable of transformation into a hard, infusible, insoluble resin by further heating.

10. An initial condensation product resulting from the reaction between formaldehyde and substantially pure xylenol which is capable of transformation into a hard, infusible, insoluble resin by further heating.

11. A hard, infusible synthetic resin being the final reaction product obtained by further heating the initial condensation product obtained by reacting a second reactant of the type that is used in the preparation of phenolic resins and substantially pure xylenol.

12. A hard, infusible synthetic resin being the final reaction product obtained by further heating the initial condensation product obtained by reacting an aldehydic compound and substantially pure xylenol.

13. A hard, infusible synthetic resin being the final reaction product obtained by further heating the initial condensation product obtained by reacting formaldehyde and substantially pure xylenol.

14. Xylenitic resin softening but not flowing on a hot plate at atmospheric pressure but flowing freely and setting to a hard mass when subjected to hot pressing at a temperature of about 165° C.

15. A xylenol-furfural-formaldehyde resin.

16. The process of making resinous reacting products which comprises forming a xylenol formaldehyde resin, incorporating the same with fibrous material, and hardening the incorporated product by heat and pressure to convert said resinous body into its infusible form.

17. A resinous product including a condensation product resulting from the reaction between a second reactant of the type that is used in the preparation of phenolic resins and substantially pure xylenol which is capable of transformation into a hard infusible insoluble resin by further heating, and a filler of fibrous material.

18. A fusible condensation product resulting from substantially pure xylenol and formaldehyde, and a filler.

19. A fusible condensation product from formaldehyde and a xylenol distillate having an initial boiling point of between 200 and 205° C. about 50% of which distillate distils over at a temperature up to 212° C.

20. A light-colored fusible xylenol-formaldehyde condensation product in substantially dry friable condition.

21. A resinous condensation product of formaldehyde and crude coal tar acids.

22. A base catalyzed resinous condensation product of formaldehyde and crude coal tar acids including a substantial amount of xylenol.

23. A magnesium oxide condensation product of formaldehyde and crude coal tar acids including a substantial amount of xylenol.

24. A resinous product containing a xylenitic resin softening but not flowing on a hot plate at atmospheric pressure but flowing freely and setting to a hard mass when subjected to hot pressing at a temperature of about 165° C., and a fibrous filler.

25. A resinous product containing a hard, substantially infusible formaldehyde condensation product of coal tar acids, including a substantial amount of xylenol, and a fibrous filler.

26. The process of producing condensation products which comprises reacting formaldehyde with a xylenol distillate having an initial boiling point of between 200 and 205° C. about 50% of which distillate distils over at a temperature up to 212° C. in the presence of a compound selected from the group of oxides and hydroxides of alkali earth metals and magnesium.

CARLETON ELLIS.